United States Patent
Hirai et al.

(10) Patent No.: US 6,952,465 B2
(45) Date of Patent: Oct. 4, 2005

(54) RADIOGRAPHIC APPARATUS

(75) Inventors: Akira Hirai, Tokyo (JP); Masakazu Morishita, Tokyo (JP); Tatsuya Yamazaki, Tokyo (JP); Isao Kobayashi, Tokyo (JP); Osamu Tsujii, Tokyo (JP); Toshikazu Tamura, Tokyo (JP); Hideki Nonaka, Tokyo (JP); Takamasa Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 10/690,559

(22) Filed: Oct. 23, 2003

(65) Prior Publication Data

US 2004/0101101 A1 May 27, 2004

(30) Foreign Application Priority Data

Nov. 21, 2002 (JP) ........................................ 2002-338191

(51) Int. Cl.$^7$ ................................................. H05G 1/64
(52) U.S. Cl. ....................... 378/98.8; 378/154
(58) Field of Search ................. 378/98.8, 145, 378/147, 149, 154; 250/370.07, 370.08, 370.09, 370.11

(56) References Cited

U.S. PATENT DOCUMENTS

| 5,448,613 | A | 9/1995 | Haendle et al. ............ 378/98.7 |
| 6,795,529 | B1 * | 9/2004 | Barnes et al. ............... 378/155 |

* cited by examiner

Primary Examiner—David V. Bruce
Assistant Examiner—Courtney Thomas
(74) Attorney, Agent, or Firm—Fitzpatrick, Cella, Harper & Scinto

(57) ABSTRACT

A radiographic apparatus capable of detecting radiation in a stable manner and in an amount suitable for a good image includes AEC detectors arranged in a stripe pattern in the space between pixels converting incident radiation into an electrical signal. The stripes of the AEC detectors are arranged so as not to be parallel to those stripes of an anti-scattering grid.

3 Claims, 5 Drawing Sheets

RADIOGRAPHIC APPARATUS

BACKGROUND OF THE INVENTION

1. Field of the Invention

The present invention relates to radiographic apparatuses.

2. Description of the Related Art

Methods of producing a radiograph of a subject by applying radiation to the subject and detecting the intensity distribution of radiation passing through the subject are widely and generally used in industrial nondestructive testing and medical diagnosis. A specific example of a general method of producing a radiograph of a subject employs a combination of a so-called "fluorescent screen" (or intensifying screen) that emits fluorescent light when excited by radiation and a silver film. Radiation is applied to the subject, and rays that pass through the subject are converted by the fluorescent screen into visible light. The silver film is exposed to this visible light, thus forming a latent image on the silver film. The silver film is then subjected to chemical processing to produce a visible image. A radiograph produced by this method is an analog photograph for use in diagnosis, testing, etc.

A computed radiographic apparatus (which hereinafter may also be referred to as a CR apparatus) that employs an imaging plate with an induced phosphor layer (hereinafter referred to as an IP) has become widely used. The IP, which is primarily excited by application of radiation and secondarily excited by visible light by, for example, a red laser, produces induced phosphorescent light. The CR apparatus detects this light emission using an optical sensor, such as a photomultiplier, to produce a radiograph. On the basis of this image data, the CR apparatus outputs a visible image to a photographic material, CRT, etc. Although the CR apparatus is a digital apparatus, the CR apparatus requires an image formation process in which an image is read by secondary excitation and is thus an indirect digital radiographic apparatus. "Indirect" here means that a captured image cannot be displayed simultaneously, as in analog technology.

Technology has been developed for producing a digital image by using, as an image receiver, a photoelectric transducer with a matrix of pixels including micro photoelectric transducer elements, switching elements, and the like. An image capture apparatus based on this technology can simultaneously display produced image data and is thus referred to as a direct digital image capture apparatus. Such a digital image capture apparatus affords an advantage over analog photographic technology in that the former needs no film and can emphasize produced information by image processing and put such information in a database. The direct digital image capture apparatus has an advantage of immediateness over the indirect digital image capture apparatus. Whereas the indirect type requires an image formation process including secondary excitation, the direct type converts a radiograph into digital data immediately after the image is captured. Whereas the indirect type requires an additional reader for secondary excitation, the direct type requires no such component.

Since an image capture apparatus using known silver photography has a narrow dynamic range with respect to the amount of radiation received, exposure is often incomplete or excessive. To ensure stable exposure, a radiation detector is placed in front of or behind the film. The image capture apparatus employs an automatic exposure control (AEC) circuit, which is referred to as a phototimer or the like, that integrates the output of the radiation detector, compares the integral with a preset value determined to achieve necessary film blackness for diagnosis, and, when the integral reaches the preset value, transmits an X-ray cut-off signal to cut off the X-ray exposure.

A digital image capture apparatus is advantageous over known silver photography in that the former has a wider dynamic range. Compared with silver photography, the digital image capture apparatus is more tolerant to incomplete or excessive exposure. Even when the amount of radiation reaching a test subject is inappropriate, the digital image capture apparatus can produce an image output suitable for diagnosis by performing image processing, such as gray level transformation or the like. When the amount of radiation reaching a test subject is low, as in general silver photography, the influence of quantization noise in the radiation intensity distribution and system noise of the apparatus becomes greater, thus degrading the S/N ratio of the image. To have a minimum amount of radiation reaching a test subject so that the minimum required quality of a produced image can be achieved, an AEC circuit is used to perform AEC, as in silver photography. U.S. Pat. No. 5,448,613 describes an X-ray diagnostic apparatus including an X-ray image intensifier and a semiconductor detector including pixels arranged in a matrix, in which AEC is performed using the outputs of some of the pixels.

A medical radiograph of a test subject is taken using a scattered ray absorption member referred to as a grid, which is placed between the test subject and the detector, to reduce the influence of scattered rays generated when radiation passes through the test subject. Generally, the grid has an array of foils such as lead foils, through which almost no radiation passes, and foils such as aluminum foils, through which radiation easily passes, which are alternately disposed in a direction orthogonal to the direction in which radiation is applied. With this arrangement, most of the radiation scattered from the test subject is absorbed in the lead foils of the grid before reaching the detector. As a result, a high-contrast image is produced.

The mentioned known digital image capture apparatus of U.S. Pat. No. 5,448,613 with a flat panel detector (FPD) using solid-state optical detectors includes an AEC circuit having radiation detectors disposed in front of the FPD, the radiation detectors being separate from the FPD. To satisfy size reduction, simplification, and cost reduction requirements for the apparatus, on the basis of advances in manufacturing technology, it has been proposed to arrange AEC radiation detectors between pixels in the FPD. In this case, the AEC radiation detectors are arranged advantageously in a stripe pattern between pixels in the FPD in order to simplify FPD read-out driving control, to minimize the influence on peripheral pixels, and to avoid as much image quality degradation as possible.

When the apparatus is used in conjunction with the grid, the AEC radiation detectors arranged in a stripe pattern are hidden behind the lead foils of the grid. As a result, the amount of rays cut off by the AEC circuit (cumulative amount of radiation) may be wrong.

SUMMARY OF THE INVENTION

In view of the above problems, it is an object of the present invention to provide a radiographic apparatus capable of detecting the amount of radiation in a stable manner.

According to the present invention, the foregoing object is attained by providing a radiographic apparatus including an image capturing unit for detecting radiograph information on an object, the image capturing unit including a group of pixels converting incident radiation into a signal; a detection unit for detecting the amount of incident radiation, the detection unit being arranged in a stripe pattern in the space between the pixels, and a scattered ray absorption grid arranged in a stripe pattern. The stripes of the detection unit are arranged in a direction not parallel to the stripes of the scattered ray absorption grid.

Other objects, features and advantages of the present invention will be apparent from the following descriptions taken in conjunction with the accompanying drawings, in which like reference characters designate the same or similar parts through the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DESCRIPTION OF THE PREFERRED EMBODIMENTS

The preferred embodiments of the present invention will be described in detail in accordance with the accompanying drawings.

Figure 1:
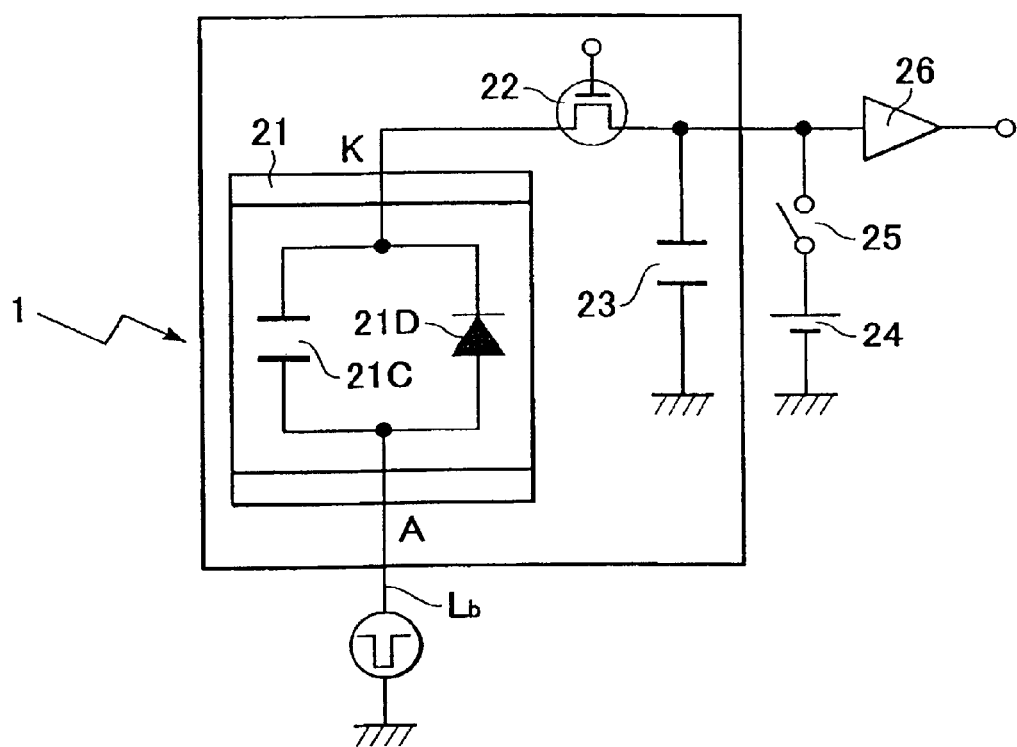
FIG. 1 is an equivalent circuit diagram of optical detectors on an FPD which is an embodiment of a radiographic apparatus according to the present invention.

The configuration of an FPD according to an embodiment of the present invention will now be described. The FPD includes a scintillator, an optical detector array, and a drive circuit. The scintillator generates fluorescent light in the visible region by recombination energy when a ground material of a phosphor is excited by high-energy radiation. Fluorescence comes from the ground material itself, such as $CaWO_4$ or $CdWO_4$, or from a luminescence center material, such as CsI:Ti or ZnS:Ag, activated in the ground material. The optical detector array is disposed adjacent to the scintillator. The optical detector array converts photons into an electrical signal. FIG. 1 shows an equivalent circuit of the optical detector array. Although a two-dimensional amorphous silicon sensor is described in the example below, optical detectors are not limited to this type of sensor and may be another type of solid-state imager.

Figure 2:
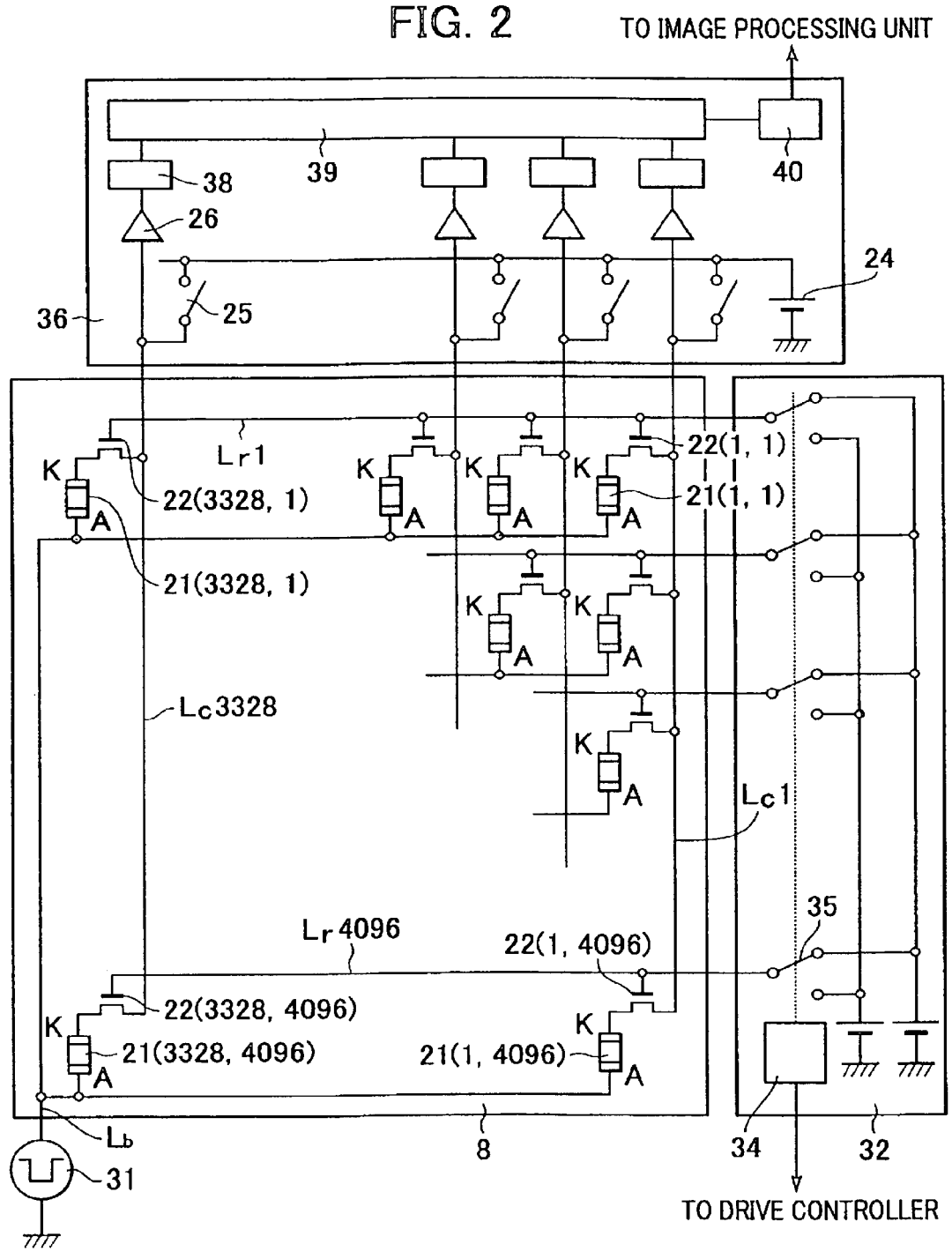
FIG. 2 is an equivalent circuit diagram of the FPD, which is the embodiment of the radiographic apparatus according to the present invention.

Referring to FIG. 2, one element (pixel) in the optical detector array includes an optical detector 21 and a switching thin-film transistor (TFT) 22 that controls charge storage and read-out. In general, pixels are formed of amorphous silicon (a-Si) arranged on a glass substrate. In the optical detector 21, numeral 21D denotes an optical diode, and numeral 21C denotes parasitic capacitance of the optical diode 21D or a capacitor connected in parallel to the optical diode 21D to improve the dynamic range of the detector. The anode A of the diode 21D is connected to a bias line Lb serving as a common electrode, and the cathode K of the diode 21D is connected to the controllable switching TFT 22 for reading out the charge stored in the capacitor 21C. In this example, the switching TFT 22 is a thin-film transistor connected between the cathode K of the diode 21D and a charge read-out amplifier 26.

After the capacitor 21C is reset by operating the switching TFT 22 and a resetting switching element 25, radiation 1 is applied to generate, by means of the optical diode 21D, charge in accordance with the amount of radiation, and this charge is in turn stored in the capacitor 21C. Subsequently, the switching TFT 22 is again operated to transfer the signal charge to a capacitive element 23. The amount of the electrical charge stored in the capacitive element 23 serves as a potential signal, which in turn is read by the preamplifier 26. This signal is A/D-converted to detect the amount of incident radiation.

FIG. 2 is an equivalent circuit diagram showing a photoelectric transducer including the two-dimensionally extended optical detector array shown in FIG. 1. The photoelectric converting operation of this photoelectric transducer will now be described. The optical detector array includes approximately 2000 by 2000 to 4000 by 4000 pixels. The array area is approximately 200 mm by 200 mm to 500 mm to 500 mm. Referring to FIG. 2, the optical detector array includes 3328 by 4096 pixels, and the array area is 350 mm by 430 mm. Therefore, the dimensions of one pixel are approximately 105 $\mu$m by 105 $\mu$m. The pixels are arranged two dimensionally by horizontally disposing 3328 pixels in one block and vertically disposing 4096 lines.

As has been described above, one pixel includes the optical detector 21 and the switching TFT 22. Numerals 21(1, 1) to 21(3328, 4096) correspond to the optical detectors 21, where K is the cathode and A is the anode of each optical detector diode. Numerals 22(1, 1) to 22(3328, 4096) correspond to the switching TFTs 22.

The K electrodes of the optical detectors 21(m, n) belonging to each column of the two-dimensional optical detector array are connected to a corresponding one (associated with each column) of common column signal lines Lc1 to Lc3328 via source-drain tracks of the corresponding switching TFTs 22(m, n). For example, the optical detectors 21(1, 1) to 21(1, 4096) belonging to column 1 are connected to the first column signal line Lc1. The A electrodes of the optical detectors 21 belonging to each row are commonly connected via the bias line Lb to a bias power supply 31 that controls the mode. The gate electrodes of the TFTs 22 belonging to each row are connected to a corresponding one of row selecting lines Lr1 to Lr4096. For example, the TFTs 22(1, 1) to 22(3328, 1) belonging to row 1 are connected to the row selecting line Lr1. The row selecting lines Lr are connected to a drive controller via a line selector 32. The line selector 32 includes, for example, an address decoder 34 and 4096 switching elements 35. With this arrangement, the line selector 32 can select an arbitrary line Lrn. Alternatively, the line selector 32 may be included in a shift register for use in a liquid crystal display or the like.

The column signal lines Lc are connected to a signal reader 36 controlled by the drive controller. Numeral 25 denotes the switch for resetting the column signal lines Lr to a reference potential of a resetting reference supply 24; numeral 26 denotes the preamplifier for amplifying the potential of a signal; numeral 38 denotes a sample/hold circuit; numeral 39 denotes an analog multiplexer; and numeral 40 denotes an A/D converter. A signal on each column signal line Lrn is amplified by the preamplifier 26 and held by the sample/hold circuit 38. An output of the sample/hold circuit 38 is sequentially output by the analog multiplexer 39 to the A/D converter 40 and converted into a digital value, which in turn is output.

In the photoelectric transducer of this embodiment, the 3328 by 4096 pixels are allocated among the 3328 lines Lcn. The outputs of the 3328 pixels per row are simultaneously transferred via the corresponding row signal line Lcn. The transferred outputs are provided to the preamplifiers 26-1 to 26-3328 and the sample/hold-circuits 38-1 to 38-3328, and are sequentially output by the analog multiplexer 39 to the A/D converter 40.

Although FIG. 2 shows that there is only one A/D converter 40, the actual A/D conversion is simultaneously performed by 4 to 32 systems to reduce the time for reading an image signal without causing unnecessary increases in analog signal bandwidth and A/D conversion rate.

Figure 3:
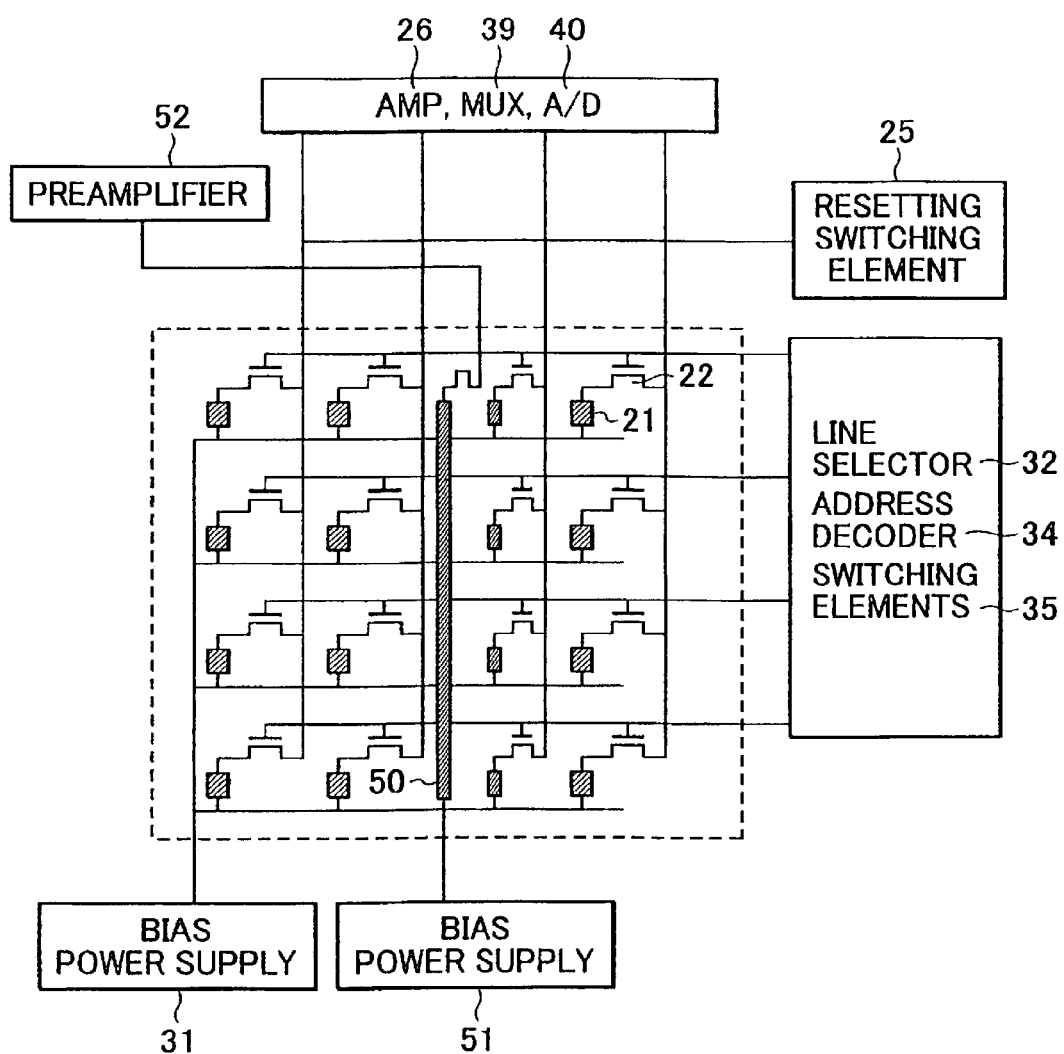
FIG. 3 is a diagram showing an example of an AEC detector incorporated in the FPD, which is the embodiment of the radiographic apparatus according to the present invention.

Referring to FIG. 3, an AEC detector 50 is separate, in terms of circuitry, from the optical detector array arranged as described above. The AEC detector 50 is disposed in the space between pixels. Numeral 51 denotes a bias power supply for the AEC detector 50, and numeral 52 denotes a preamplifier for amplifying an output of the AEC detector 50. Since a general optical detector array has lines that are disposed vertically and horizontally between pixels, an aperture of each optical detector diode is designed to occupy as much as possible of the portion other than the transmitting TFT of each pixel in order to increase the aperture ratio as much as possible. To dispose the AEC detector 50 on the optical detector array, the apertures of the adjacent optical detection pixels are reduced to provide a free space in which the AEC detector 50 is disposed. Alternatively, while retaining the transmitting TFTs, the optical detector diodes may be removed to provide a free space in which the AEC detector 50 is disposed. In the latter case, some image data forming the image is lost. It is thus necessary to perform pixel interpolation for interpolating the lost pixel data from the surrounding pixel data in the output image data.

Regions in which the AEC detectors 50 are disposed on the two-dimensional optical detector array will now be described. In general, AEC detectors are not simply provided for a few pixels or for one line. For example, in the case of a chest x-ray, a known AEC device, typified by a phototimer, generally measures the amount of radiation reaching lung fields. When the radiation applied to these fields reaches a predetermined amount, the application of radiation is cut off. If the AEC detector is not correctly placed in the lung fields due to differences in physique and internal anatomy from one patient to another or misalignment upon image capturing, the AEC detector is placed in a region in which the amount of penetrated radiation is less than that in the lung fields. As a result, a larger amount of radiation is applied than expected, and the AEC does not fulfill its function. Therefore, an AEC detection region must have sufficiently large dimensions to ensure its ability to perform its function. In this embodiment, the AEC detectors are provided on a square region of 50 mm by 50 mm, as in the known phototimer or the like. The AEC detectors need not be disposed in every space between pixels in this square region. For example, as shown in FIG. 4, when the vertical and horizontal pixel pitches of the optical detector array are each 105 $\mu$m, AEC detection regions are formed by vertically disposing five stripes of AEC detectors at intervals of 100 pixels, the AEC detectors being arranged in a line extending along 500 pixels in the horizontal direction.

Figure 5:
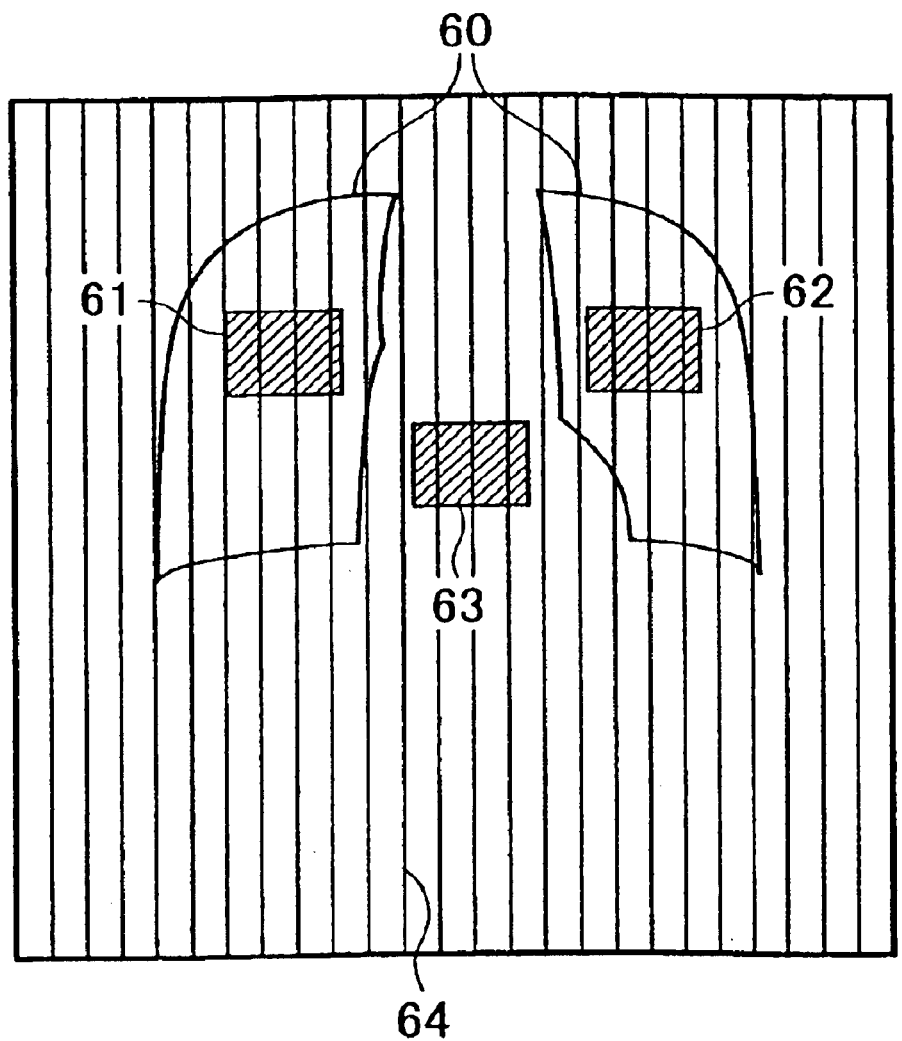
FIG. 5 illustrates the arrangement of known AEC detection regions.

FIG. 5 shows the arrangement relationship between detection regions for known AEC devices typified by phototimers for a general chest X-ray and a grid. Numeral 60 denotes regions corresponding to lung fields of a test subject. AEC detection regions 61, 62, and 63 are disposed in the left and right lung fields of the test subject and in the mediastinal space therebetween. A grid 64 is arranged in a stripe pattern in which the stripes are disposed parallel to the body axis. These stripes are alternately formed of foils such as lead foils, with low radiation transmission, and foils such as aluminum foils, with high radiation transmission. Alternatively, these stripes are created by projecting the grid onto the FPD by radiation.

Figure 4:
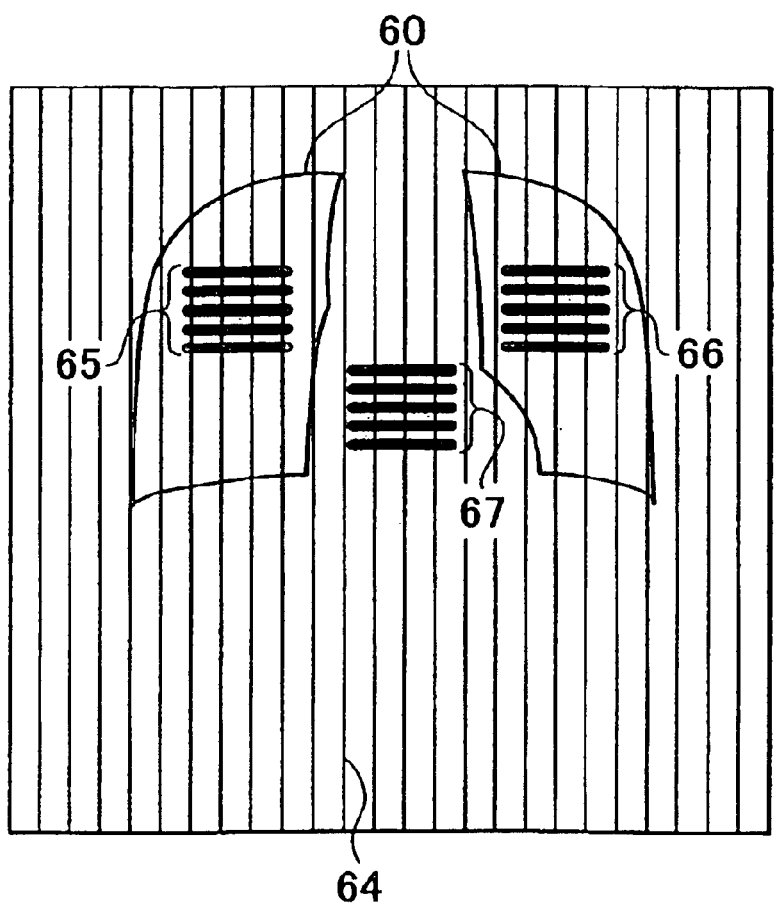
FIG. 4 illustrates an example of the arrangement of AEC detection regions.

In the case of the FPD, as shown in FIG. 4, the AEC detectors are arranged in a stripe pattern in three regions, as in the known AEC detectors. The grid is arranged such that the stripes of the grid are substantially orthogonal to the stripes of the AEC detectors. Accordingly, the grid's blocking factor for the AEC detectors becomes stable, and so does the detection of the amount of radiation. Although the direction of the stripes of the AEC detectors is orthogonal to the direction of the stripes of the grid in this embodiment, it is clear that similar advantages are achieved by arranging the stripes of the AEC detectors and the stripes of the grid in any arrangement other than parallel to each other. To arrange the two stripe patterns so as not to be parallel to each other, the apparatus is designed to ensure non-parallelism, by taking into consideration backlash in the grid on the apparatus, manufacturing tolerances, and the like.

The following are advantages of arranging the stripes of the AEC detectors orthogonal to the stripes of the grid:

(1) Although the stripe pitch of the grid varies depending on manufacturing tolerances, this variation only has a small influence on the variation in the blocking factor;
(2) Even when the grid has backlash in the direction orthogonal to the stripes of the grid, the orthogonal displacement of the grid only has a small influence on the variation in the blocking factor; and
(3) When the blocking factor is stable and low, AEC preset values need not be changed in response to insertion and removal of the grid, etc.

In contrast, the following are situations when the stripes of the AEC detectors are arranged orthogonal to the stripes of the grid:

(1) Variation in the stripe pitch of the grid due to manufacturing tolerances have a large influence on variation in the blocking factor;
(2) When the grid has backlash in the direction orthogonal to the stripes of the grid, the blocking factor may greatly vary due to the orthogonal displacement of the grid; and
(3) When the blocking factor is high or varies greatly, AEC preset values may be required to be changed in response to insertion and removal of the grid, etc.

As has been described above, according to this embodiment, in the radiographic apparatus including the AEC detectors arranged in a stripe pattern in the FPD, the amount of radiation can be detected in a stable manner even when the scattered ray absorption grid is placed in front of the FPD.

Other Embodiments

Furthermore, the program code read from the storage medium may be written to a memory of a function extension board inserted in the computer or a function extension unit connected to the computer. The functions of the embodiment may be realized by executing part of or the entire process by a CPU, etc. of the function extension board or the function extension unit based on instructions of the program code. This is also one of embodiments of the present invention.

It is to be understood that the present invention may also be applied to a system including a plurality of apparatuses (e.g., radiation generating apparatuses, radiographic apparatuses, image processing apparatuses, and interface apparatuses, etc.) and to a single apparatus in which functions of these apparatuses are integrated. When the present invention is applied to a system including a plurality of apparatuses, the apparatuses communicate with one another via, for example, electrical, optical, and/or mechanical means, and/or the like.

Furthermore, the present invention may also be applied to an image diagnosis aiding system including a network (LAN and/or WAN, etc.).

The present invention thus achieves the above-described object as described above.

The present invention is not limited to the above embodiments and various changes and modifications can be made within the spirit and scope of the present invention. Therefore to apprise the public of the scope of the present invention, the following claims are made. The scope of the following claims is to be accorded the broadest interpretation so as to encompass all such modifications and equivalent structures and functions.

What is claimed is:

1. A radiographic apparatus comprising:

image capturing means for detecting radiograph information on an object, the image capturing means including a group of pixels to convert incident radiation into a signal;

detection means for detecting an amount of incident radiation, the detection means being arranged in a pattern of stripes in spaces between the pixels, and a scattered-ray absorption grid arranged in a pattern of stripes, wherein the stripes of the detection means are arranged so as not to be parallel to the stripes of the scattered-ray absorption grid.

2. A radiographic apparatus according to claim 1, wherein the stripes of the detection means are arranged substantially orthogonal to the stripes of the scattered-ray absorption grid.

3. A radiographic apparatus according to claim 1 or 2, wherein the detection means is provided in a plurality of separate regions.

* * * * *

UNITED STATES PATENT AND TRADEMARK OFFICE
CERTIFICATE OF CORRECTION

PATENT NO. : 6,952,465 B2
DATED : October 4, 2005
INVENTOR(S) : Akira Hirai et al.

It is certified that error appears in the above-identified patent and that said Letters Patent is hereby corrected as shown below:

Column 5,
Line 44, "When'the" should read -- When the --.

Signed and Sealed this

Twenty-fifth Day of April, 2006

JON W. DUDAS
*Director of the United States Patent and Trademark Office*